United States Patent [19]
Runge

[11] 3,878,474
[45] Apr. 15, 1975

[54] PHASE LOCKED LOOP

[75] Inventor: Peter Klaus Runge, Fair Haven, N.J.

[73] Assignee: Bell Telephone Laboratories, Incorporated, Murray Hill, N.J.

[22] Filed: June 17, 1974

[21] Appl. No.: 479,604

[52] U.S. Cl. .................................... 331/10; 325/423
[51] Int. Cl. ............................................. H03b 3/06
[58] Field of Search ............ 331/10, 1, 18; 325/423

[56] References Cited

UNITED STATES PATENTS

| | | | |
|---|---|---|---|
| 3,189,825 | 6/1965 | Lahti et al. | 325/423 |
| 3,359,505 | 12/1967 | Smeullers | 331/10 |
| 3,395,360 | 7/1968 | Smeullers | 331/10 |
| 3,534,284 | 10/1970 | Beurrier | 331/10 |
| 3,534,285 | 10/1970 | Kobold et al. | 331/10 |

*Primary Examiner*—John Kominski
*Attorney, Agent, or Firm*—S. Sherman

[57] ABSTRACT

The jitter bandwidth of a phase locked loop is significantly reduced by the proper selection of the amplitude and phase of the component of input signal injected into the loop voltage controlled oscillator.

3 Claims, 7 Drawing Figures

PHASE LOCKED LOOP

This invention relates to phase locked loops.

BACKGROUND OF THE INVENTION

Phase controlled oscillators, also known as phase locked oscillators or phase locked loops (PLL) are commonly used to recover timing information in pulse-code-modulated (PCM) communication systems. Typically, a phase locked loop includes a phase detector for measuring small differences in phase between an incoming signal and a voltage controlled local oscillator (VCO). Any difference thus detected generates an error signal which is then applied to the local oscillator and serves to tune the latter so as to minimize the measured phase difference.

When used in a PCM system to recover timing information, one of the more important operating characteristics of a phase locked loop is the ability of the local oscillator to track accurately the phase of the incoming signal in the presence of noise. To the extent that it does not, an uncertainty or time jitter is produced which, ultimately, imposes a limit upon the physical length of the communication system. If extended beyond this limit, the error rate tends to increase to an unacceptable level.

Accordingly, it is the broad object of the present invention to improve the time jitter performance of phase locked loops.

Because they are unconditionally stable, most phase locked loops are so-called "second order" loops. While the jitter performance can be improved by going to "third order" loops, the latter are not unconditionally stable and, hence, are not preferred.

Thus, it is a more specific object of the present invention to achieve the time jitter performance of a third order loop while retaining the stability capabilities of a second order loop.

SUMMARY OF THE INVENTION

The present invention utilizes phase locked loops with signal injection directly into the voltage controlled oscillator (PLLI). In accordance with the present invention, the amplitude and phase of the input signal coupled to the VCO are specifically selected to minimize the jitter bandwidth. Typically, the optimum phase angle lies within the range between 15° and 25°. The amplitude of the injected signal is, in turn, a function of the phase angle. When optimized, as a function of the system parameters, the resulting jitter bandwidth is reduced by as much as 75 percent.

It is an advantage of the present invention that it achieves the time jitter performance of a third order phase locked loop while retaining the unconditional stability of a second order loop.

It is a further advantage of the present invention that this improved performance is realized with a minimum of added circuitry.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
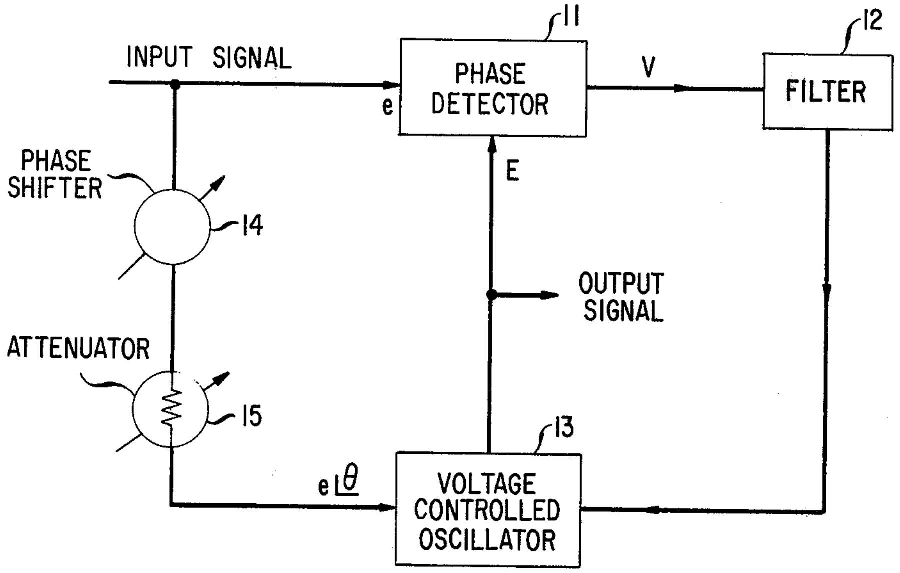
FIG. 1 shows, in block diagram, a phase locked loop in accordance with the present invention.

Referring to the drawings, FIG. 1 shows in block diagram a phase locked loop 10 with input signal injection to the voltage controlled oscillator (VCO) in accordance with the present invention. Typically, a phase locked loop comprises a phase detector 11; a filter 12; and a voltage controlled oscillator 13. In operation, phase detector 11 measures the phase difference between the input signal $e$ and the VCO signal E, and generates an error signal V which is a function thereof. The error signal, in turn, is fed back to the VCO by means of filter 12 in a manner so as to minimize the measured phase difference and, thereby, reduce the magnitude of the error signal. For a thorough discussion of phase locked loops, their operation and characteristics, see "Principles of Coherent Communication" by A. J. Viterbi, published by McGraw-Hill Book Company.

In addition to the above, a component of input signal is coupled to the VCO so as to increase the pull-in range of the phase locked loop as taught in U.S. Pat. No. 3,189,825. However, in accordance with the present invention, signal injection to the VCO is made through a phase shifter 14 which serves to control the phase of the injected signal, and an attenuator 15 which controls the amplitude of the injected signal.

The phase locked loop shown in FIG. 1 is a so-called "second order" loop with injection (PLLI) whose phase transfer function H(s) at zero phase angle is given by $$H(s) = (AK\,(s+a)/s^2 + AKs + AKa), \tag{1}$$

where $s = i\omega$;

$A$ is a proportionality constant;

$K$ is the loop gain;

and $a$ is the filter constant.

Figure 2:
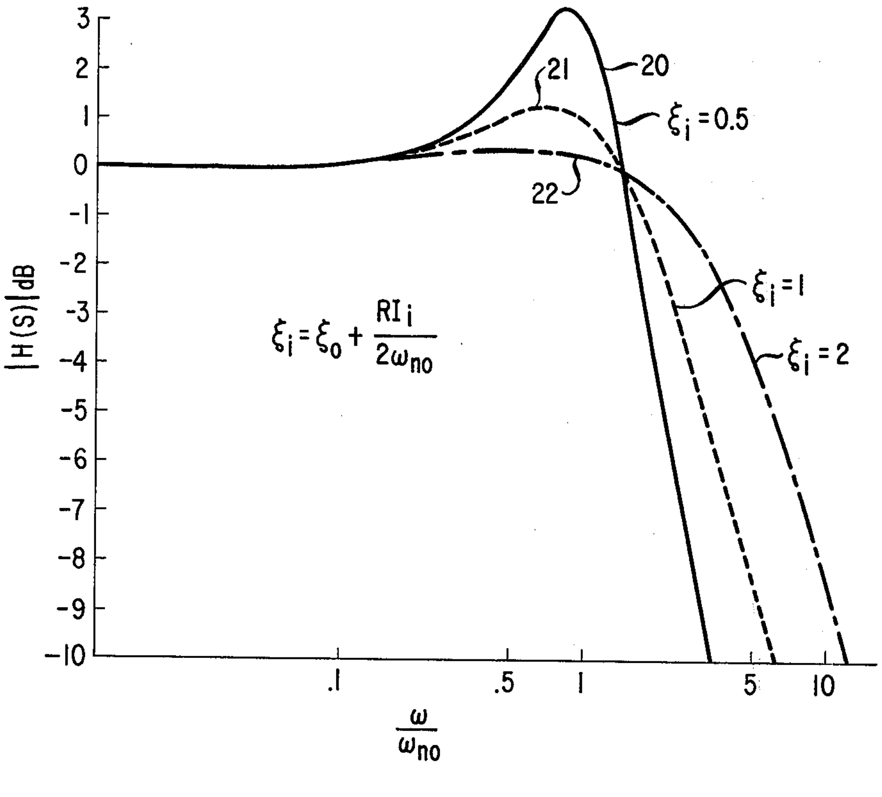
FIG. 2 shows the transfer function of a second order loop as a function of frequency for different damping factors.

Equation (1) is illustrated graphically in FIG. 2 which shows the variation of the transfer function H(s), expressed in dB, as a function of frequency, normalized with respect to the natural frequency of the loop $\omega_{no}$. As can be seen, the transfer function tends to be flat at the lower frequencies. However, it has an undesirable sharp peak at the higher frequencies, as shown by curve 20. This characteristic peak of a second order loop can be suppressed by increasing the damping factor $\xi_i$. However, as can be seen by curves 21 and 22, as the damping factor is increased the loop noise bandwidth is also increased.

One can more nearly approach a flat transfer characteristic without the penalty of a broadened loop noise bandwidth by going to a third order loop. This involves the addition of a second integrator to the loop filter, in which case the filter transfer function is given by $$F(s) = 1 + a/s + b/s^2, \qquad (2)$$

and the closed loop transfer function is given by $$H(s) = (AKs^2 + aAKs + bAK/s^3 + AKs^2 + aAKs + bAK) \qquad (3)$$

While the added degree of freedom available in a third order loop permits one to eliminate the transfer function peak without incurring any bandwidth penalty, a third order loop lacks the unconditional stability of a second order loop and, hence, is not preferred.

Figure 3:
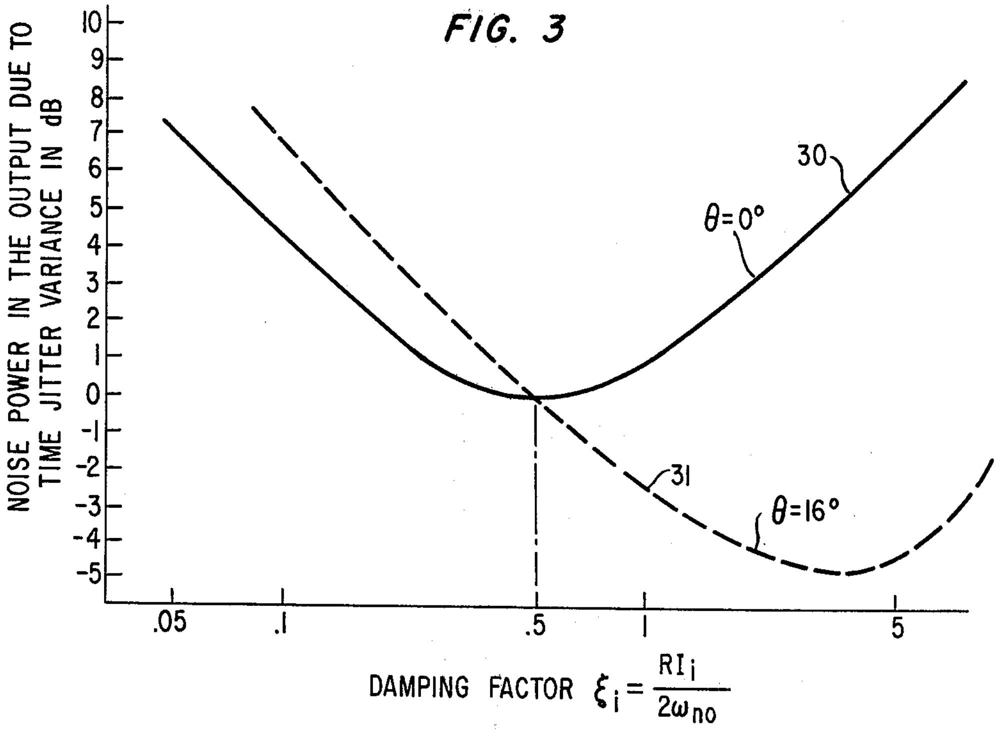
FIG. 3 shows the time jitter as a function of the damping factor of a phase locked loop when adjusted in accordance with the prior art and when adjusted in accordance with the present invention.
Figure 4:
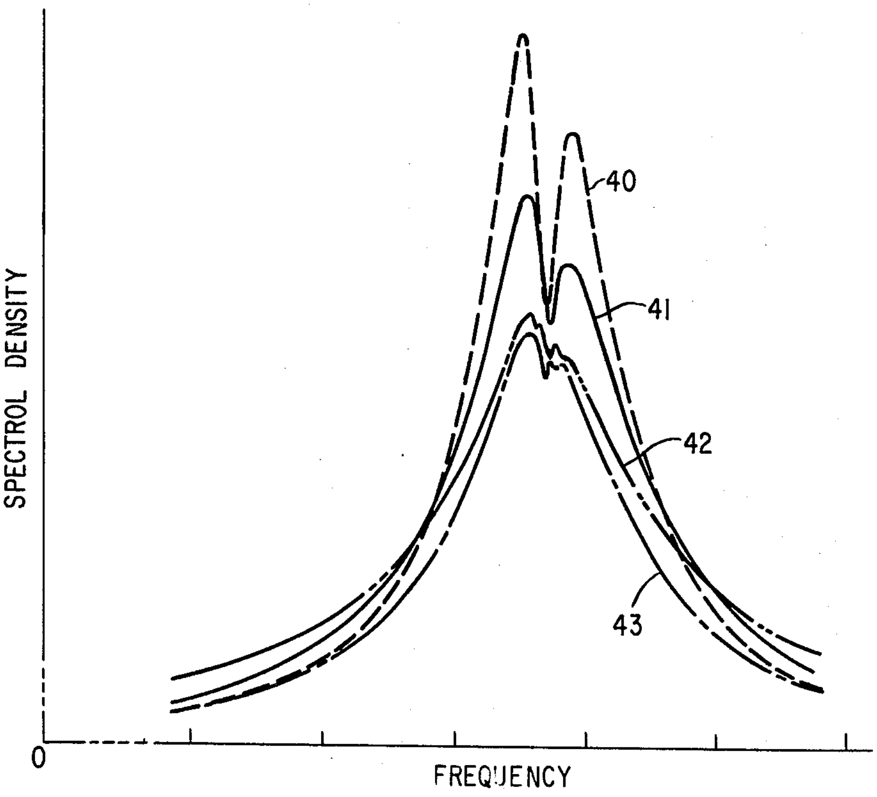
FIG. 4 shows the spectral density distribution at the output of a second order loop when adjusted in accordance with the prior art for three different damping factors, and when adjusted in accordance with the present invention.
Figure 7:
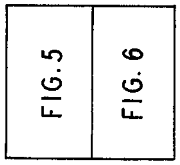
FIG. 7 is a key figure showing the relationship between FIGS. 5 and 6.

In accordance with the present invention, the preferred characteristics of both the second and third order phase locked loops are realized by controlling the amplitude of the component of input signal injected into the VCO, and its phase relative to the phase of the oscillator signal at the point of injection. The improvement in performance can be readily observed by first adjusting the phase locked loop in accordance with the prior art wherein the angle $\theta$ of the injection signal to the VCO is zero. When this is done, and the noise power at the output due to time jitter is measured as a function of signal injection, one obtains a curve 30 of the type shown in FIG. 3. As can be seen, the time jitter variance is a minimum for $\theta = 0$ when the damping factor, $\xi_i$, is equal to 0.5, where $\xi_i$ is proportional to the amplitude of the injected signal.

If now the phase of the injected signal is changed, the time jitter variance decreases and finally reaches a minimum. With the phase optimized for minimum jitter, the amplitude of the injected signal is increased until a second, deeper minimum is obtained. The phase angle can then be reset and a second adjustment made of the injected signal amplitude, further optimizing (i.e., minimizing) the time jitter. The resulting improvement in the time jitter variance characteristic is illustrated by curve 31. As can be seen, the time jitter variance is reduced by close to 5dB at a phase angle of $\theta = -16°$. This optimum was obtained with an eight-fold increase in the amplitude of the injected signal.

Curves 40, 41 and 42 show the spectral density distribution at the output of a second order loop with signal injection when adjusted in accordance with the prior art for three different damping factors, while curve 43 shows the spectral density for the same phase locked loop when adjusted in accordance with the present invention. It will be noted, as indicated hereinabove, that as the damping is increased in accordance with the prior art, the bandwidth tends to increase as the peaks are suppressed. By contrast, in a phase locked loop in accordance with the present invention, the peaks are eliminated with no increase in bandwidth.

While it is relatively simple to determine experimentally the optimum phase and amplitude of the injection signal, both can be calculated by means of the following relationships.

$$\text{Sin}\ \theta = -S_{cs}/S_c, \qquad (4)$$

and $$RI_i/2\omega_{no} = 1/\sqrt{1 + (S_{cs}/S_s)\ \text{Sin}\ \theta}, \qquad (5)$$

where $S_c$ is the in-phase noise term spectral density;

$S_s$ is the quadrature noise term spectral density; and $S_{cs}$ is the cross spectral density.

(The noise terms are given by equations (1.1) and (1.11) in the above-cited book by Viterbi.)

For a particular system, equation (5) can be rewritten in terms of $\theta$ as follows:

$$I_i = M/\sqrt{1 + N\ \text{Sin}\ \theta}, \qquad (6)$$

where M and N are constants of the system.

It will be noted that in a linear system with Gaussian noise $S_{cs} = 0$ and the optimum phase angle $\theta$ is zero, as in U.S. Pat. No. 3,189,825 cited hereinabove. In a nonlinear (PCM) system, however, $S_{cs} \neq 0$ and $\theta$ will typically fall within the range between $-15°$ to $-25°$. Similarly, in a nonlinear system the factor $S_{cs}/S_s$ Sin $\theta$ in equation (5) is negative, resulting in an optimum injection current that is five to ten times larger than in the prior art phase locked loops.

Figure 5:
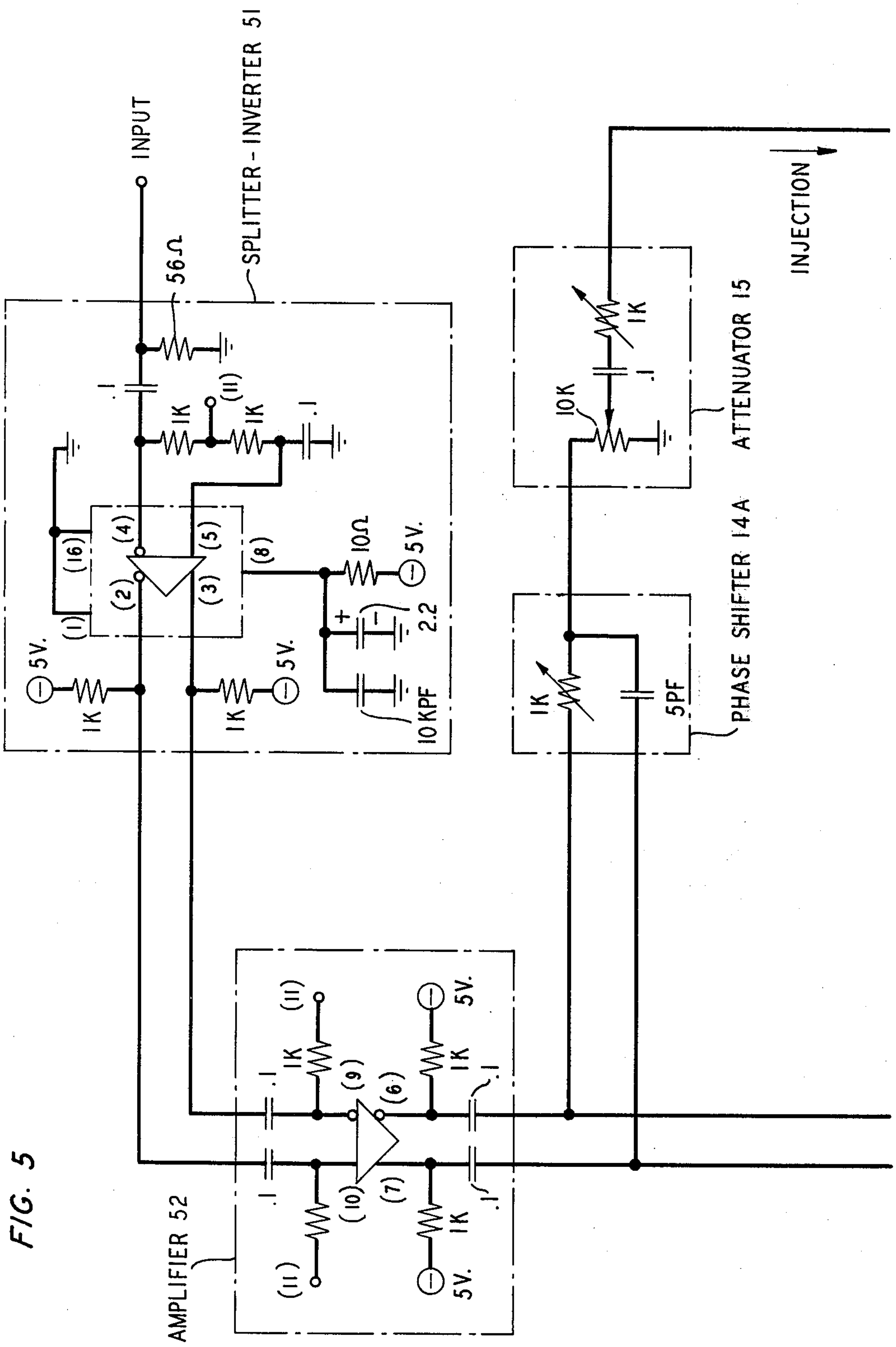
FIGS. 5 and 6 show a circuit diagram of a phase locked loop in accordance with the present invention.
Figure 6:
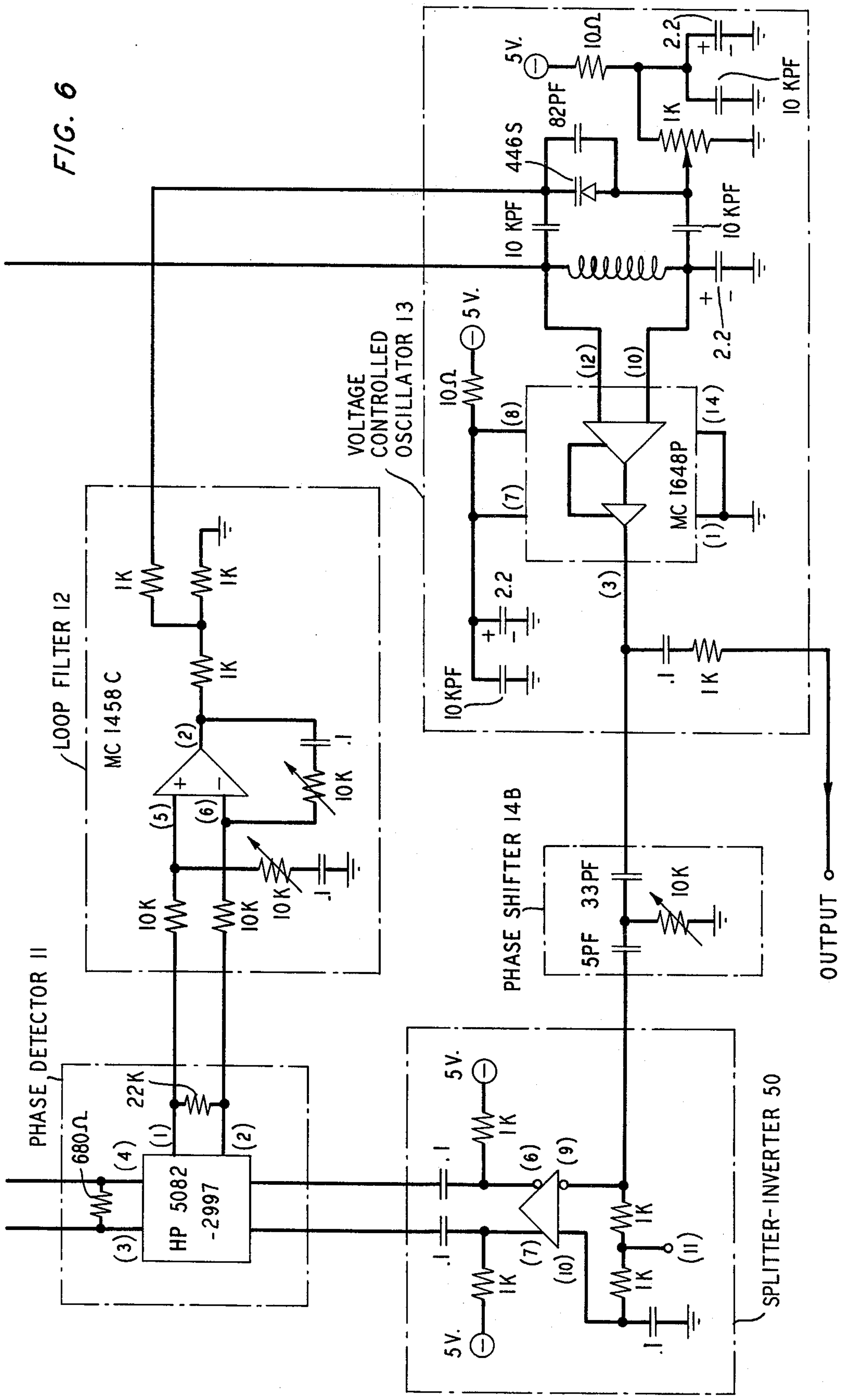

FIGS. 5 and 6, included for purposes of illustration, show the circuit diagram of a phase locked loop constructed by applicant and used to obtain the abovedescribed data. Using the same identification numerals as were used in FIG. 1 to identify corresponding components, the circuit diagram of FIGS. 5 and 6 includes a phase detector 11, a loop filter 12, and a VCO 13. Because phase detector 11 is a Hewlett-Packard (HP5082-2997) balanced diode quad, the input signal, which is an unbalanced binary signal, is first converted to a balanced signal by means of a splitter-inverter 51, and then amplified by means of an amplifier 52, before being applied to detector 11. Similarly, the unbalanced signal derived from VCO 13 is converted to a balanced signal by means of a second splitter-inverter 50 before being applied to detector 11.

For purposes of experimentation, two phase shifters 14A and 14B are used in this embodiment. With phase shifter 14A adjusted for zero phase shift, phase shifter 14B is adjusted for zero injection angle ($\theta = 0$). Phase shifter 14A is used thereafter as a means of adjusting the injection angle. Attenuator 15 is used, as explained hereinabove, to adjust the amplitude of the injection signal.

It is apparent that numerous and varied other specific arrangements can readily be devised in accordance with these principles by those skilled in the art without departing from the spirit and scope of the invention.

I claim:

1. A phase locked loop including:

a phase detector for generating an error signal;

a voltage controlled oscillator whose frequency is varied by said error signal;

means for coupling said error signal to said oscillator;

means for coupling said oscillator to said phase detector;

means for coupling an input signal to said phase detector;

and means for injecting a component of said input signal into said voltage controlled oscillator; CHARACTERIZED IN THAT:

the phase angle, $\theta$, of the component of input signal injected into said oscillator, relative to the phase of the oscillator signal at the point of injection, is substantially different than zero in order to significantly reduce the jitter bandwidth of the said phase locked loop.

2. The phase locked loop according to claim 1 where said phase angle $\theta$ lies within the range between −15° and −25°.

3. The phase locked loop in accordance with claim 1 wherein the amplitude, $I_i$, of the component of input signal injected into said oscillator is related to said phase angle $\theta$ by $$I_i = M/\sqrt{1 + N \sin\theta},$$

where M and N are constants of the system.

* * * * *